United States Patent
Jeddeloh

(10) Patent No.: US 6,363,445 B1
(45) Date of Patent: Mar. 26, 2002

(54) METHOD OF BUS ARBITRATION USING REQUESTING DEVICE BANDWIDTH AND PRIORITY RANKING

(75) Inventor: Joseph Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/173,573

(22) Filed: Oct. 15, 1998

(51) Int. Cl.⁷ ........................ G06F 13/36; G06F 13/362
(52) U.S. Cl. ........................ 710/113; 710/40; 710/107; 710/110; 710/119; 710/240; 710/241; 711/151; 711/202
(58) Field of Search ............................. 74/40, 41, 107, 74/108, 110, 111, 113, 114, 116, 119, 121, 123, 240, 241, 242, 244; 711/151, 202

(56) References Cited

U.S. PATENT DOCUMENTS

| | | | |
|---|---|---|---|
| 5,193,197 A | | 3/1993 | Thacker |
| 5,392,033 A | * | 2/1995 | Oman et al. ............. 340/825.5 |
| 5,396,602 A | * | 3/1995 | Amini et al. ............... 710/113 |
| 5,430,848 A | | 7/1995 | Waggener |
| 5,509,125 A | * | 4/1996 | Johnson et al. ............. 710/120 |
| 5,546,548 A | * | 8/1996 | Chen et al. .................. 710/116 |
| 5,644,729 A | | 7/1997 | Amini et al. |
| 5,687,167 A | | 11/1997 | Bertin et al. |
| 5,805,840 A | * | 9/1998 | Dutton ....................... 710/116 |
| 5,805,905 A | * | 9/1998 | Biswas et al. .............. 710/244 |
| 5,845,116 A | | 12/1998 | Saito et al. |
| 5,848,297 A | | 12/1998 | Krein et al. |
| 5,862,338 A | | 1/1999 | Walker et al. ......... 395/200.54 |
| 5,872,939 A | | 2/1999 | Ramsey et al. ............. 395/300 |
| 5,884,050 A | * | 3/1999 | Wheeler et al. ............. 710/107 |
| 5,907,688 A | | 5/1999 | Hauck et al. |
| 5,956,493 A | * | 9/1999 | Hewitt et al. ................ 711/113 |
| 6,006,303 A | * | 12/1999 | Barnaby et al. ............. 710/244 |
| 6,016,528 A | * | 1/2000 | Jaramillo et al. ............ 710/243 |
| 6,088,751 A | | 7/2000 | Jaramillo |
| 6,092,137 A | | 7/2000 | Huang et al. |

OTHER PUBLICATIONS

IBM Technical Disclosure Bulletin, Jun. 1, 1990, US, vol. 33, Issue No. 1A, Pages:1–46, Disclosure Title: "Time Division Multiplexed Service Requesting.".

* cited by examiner

Primary Examiner—Rupal Dharia
(74) Attorney, Agent, or Firm—Knobbe, Martens, Olson & Bear

(57) ABSTRACT

A bus arbitration regulates access to a common bus by a plurality of devices by assigning each device a priority rank. A current weighted bandwidth of each device is set equal to a desired weighted bandwidth. A request to access the common bus is granted to the device having the highest priority rank among a set of requesting devices. The current weighted bandwidth the first device is decremented. The priority rank of the serviced device is set equal to a lowest value if its current weighted bandwidth is equal to a minimum value. The priority rank of a set of devices which previously had a lower priority rank than the first device is increased. The current weighted bandwidth of the serviced device is set equal to the desired weighted bandwidth. After a number of bus transactions have been completed, the desired weighted bandwidth of the devices may be adjusted to based upon system performance.

9 Claims, 3 Drawing Sheets

METHOD OF BUS ARBITRATION USING REQUESTING DEVICE BANDWIDTH AND PRIORITY RANKING

RELATED APPLICATIONS

The subject matter of the U.S. Patent Application entitled APPARATUS FOR EFFICIENT BUS ARBITRATION, filed on Oct. 15, 1998, application Ser. No. 09/173,507.

BACKGROUND OF THE INVENTION

1. Field of the Invention

The invention relates to computers. More particularly, the invention relates to bus arbitration within a computer.

2. Description of the Related Art

FIG. 1 is a block diagram showing a computer system 10. The computer system 10 includes a processor bus 12 coupled to a cache memory 14 and to a computer processor 16. Typical processor buses currently operate at clock speeds between 66 MHz and 133 MHz. The computer system 10 also includes a system memory 17 coupled to the processor bus 12 by a memory controller 18. A Peripheral Components Interconnect (PCI) bus 22 is also coupled to the processor bus 12 by a PC-host bridge 20. The PCI bus 22 is used to separate the operation of the peripheral components from the functions executed over the processor bus 12 so that the processor bus 12 may remain dedicated to directly serving the computer processor 16. Separating these operations increases the effective operation speed of the computer. Typical PCI buses currently operate at clock speeds between 33 MHz and 66 MHz. A graphics monitor 26 is coupled to the PCI bus 22 by a graphics controller 24. An Industry Standard Architecture (ISA) bus 28 is also coupled to the PCI bus 22 via a PCI/ISA bridge 30. A hard drive 32 and an input device 34, such as a keyboard, game adaptor, mouse, or microphone, are coupled to the ISA bus 28. The ISA bus 28 is an expansion bus used to separate additional functions from the functions executed over the processor bus 12. Typical ISA buses currently operate at clock speeds between 6 MHz and 8.33 MHz.

As computer devices have become more sophisticated and faster, it has become more difficult for the computer buses, such as the processor bus 12, the PCI bus 22 and the ISA bus 28 to keep up with the increased rate of data flow requested by the various computer devices. Whenever the graphics controller 24, hard drive 32 or input device 34 requests access to the system memory 17, the request must be transmitted across the PCI bus 22 as well as the processor bus 12. As such, the performance of the computer system 10 can be limited by the throughput of the processor bus 12, the PCI bus 22, and the ISA bus 28. As the speed of the computer devices continues to increase, the dependence of the computer performance upon the delay caused by sharing the computer bus resources becomes more acute.

In addition to the increased speed of current computer devices, the computer buses must be able to handle an increased number of computer devices. For example, many current computer systems have Compact Disc-Read Only Memory (CD-ROM) drives, local area network (LAN) connectors, modems, plural microprocessors, high speed redundant array of inexpensive disks (RAID) controllers and fiber optic network connectors, in addition to the standard computer devices shown in FIG. 1. Each new computer device or peripheral added to the computer must share the same limited bus resources.

A device which contends for the shared bus resource is referred to as a bus mastering device. Each bus mastering device may have different operating characteristics than the others. Such operating characteristics include the speed at which the device operates and resource usage patterns. Only one of the bus mastering devices on the PCI bus 22 may use the PCI bus 22 at any one time. If a device wants to carry out a transaction over the PCI bus 22, it must first be assigned control of the PCI bus 22 by a bus arbiter 21. Therefore, when one of the bus mastering devices desires control of the PCI bus 22, it sends a request to the bus arbiter 21. If the bus is idle, the bus arbiter 21 assigns control of the PCI bus 22 to the device to complete one transaction. After completing the transaction, the device must return control of the PCI bus 22 to the bus arbiter 21. If the bus mastering device has additional bus transactions to complete, it may once again request control of the bus.

In prior art systems, each bus mastering device is given equal access to the PCI bus 22. The bus arbiter 21 cycles through a circular priority regime in which each device is in turn given priority over all others if it has a transaction to complete. For example, if there are four bus mastering devices on a bus, the bus arbiter 21 assigns a priority ranking to the devices in the pattern such as 0, 1, 2, 3, 0, 1, 2, 3 . . . with the priority rank assigned to each device rotating each time that any device accesses the bus. If the highest priority device does not have a transaction to complete, the control of the PCI bus 22 may be passed to the device with the next highest priority which has a transaction to complete.

As technology advances, some bus mastering devices continue to have increasing operating speeds and are, therefore, able to transfer large amounts of data quickly. Other devices have more limited operating speeds. In addition, the operation associated with certain device consistently entails the transfer of large blocks of data while other devices generate smaller more sporadic blocks of data. Therefore, in a computer system, each bus is likely to be serving requests from a set of bus mastering devices with a large variety of capabilities and requirements.

As the need for computer speed continues to increase, it is advantageous to promote the efficient use of the system resources which are available. The prior art bus arbitration scheme may provide an efficient allocation of resources in a system in which equally performing bus mastering devices request the use of system resources in a similar and consistent manner. However, in reality, the speed at which the bus mastering devices are capable of operating can vary by an order of magnitude. In addition, the usage pattern for the devices, in terms of the frequency of the requests and the number of consecutive requests which are received from any one device, may vary from device to device. Under these operating conditions, the uniform arbitration scheme of the prior art does not promote the efficient use of system resources. The slower devices with large blocks of data to transfer can interfere with the transfer of data from faster devices. Therefore, when the bus resources are not sufficient to service the needs of the multiple devices which are requesting access to the bus, just one slow device may significantly decrease the amount of data transferred over the bus.

In addition, the usage pattern of certain devices can vary as a function of time. For example, a RAID controller may be very active during a period of intensive file transfer and, yet, may lie inactive for great periods of time under normal operation. The prior art bus arbitration scheme does not account for usage patterns or variations in the usage patterns over time and, thus, does not promote an efficient use of system resources.

Therefore, there has been a long felt need in the industry to have a means and method of bus arbitration which promotes the efficient use of system resources.

SUMMARY OF THE INVENTION

The bus arbitration system and method arbitrates bus access based upon the performance characteristics of the devices. Each device is allowed to access the bus in approximate proportion to a desired weighted bandwidth. The desired weighted bandwidth reflects performance abilities and requirement of the devices. Access to the bus is also governed by reference to a priority ranking to prevent the faster devices from monopolizing the bus to the exclusion of the slower devices.

In one embodiment, each device is initially assigned a current weighted bandwidth equal to the desired weighted bandwidth and is also assigned a priority ranking. The bus arbiter grants access to the bus to the requesting device with the highest priority rank regardless of the current or desired value of the corresponding weighted bandwidth. Each time that a device is granted access to the bus, the value of its current weighted bandwidth is decremented. If the value of the decremented current weighted bandwidth is equal to a minimum value, the priority rank of the device is set to the minimum value and the priority rank of devices which previously had a lower priority rank is incremented. The current weighted bandwidth of the device is reset to the desired value.

As transactions over the bus are completed, the total number of bus access requests which have been granted as well as the number of granted requests corresponding to each device are tallied. After a number of requests have been granted, the ratio of the number of grants for the device to the total number of granted requests is calculated for each device. If ratios are comparable to the desired weighted bandwidths, the system is balanced and no changes are made. If the ratios are not comparable to the desired weighted bandwidths, the weighted bandwidths of the devices may be adjusted to more closely match the actual performance of the system. In an alternative embodiment, the number of data transfers or some other measure of data transfer could be used in place of the number of requests or grants.

In this way, the bus resources are allocated among the devices in a manner which allows the faster devices to have more frequent access to the bus thus increasing the average amount of data transferred over the bus without allowing the faster devices to monopolize the bus to the exclusion of the slower devices.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout and wherein.

DETAILED DESCRIPTION OF THE INVENTION

Figure 1:
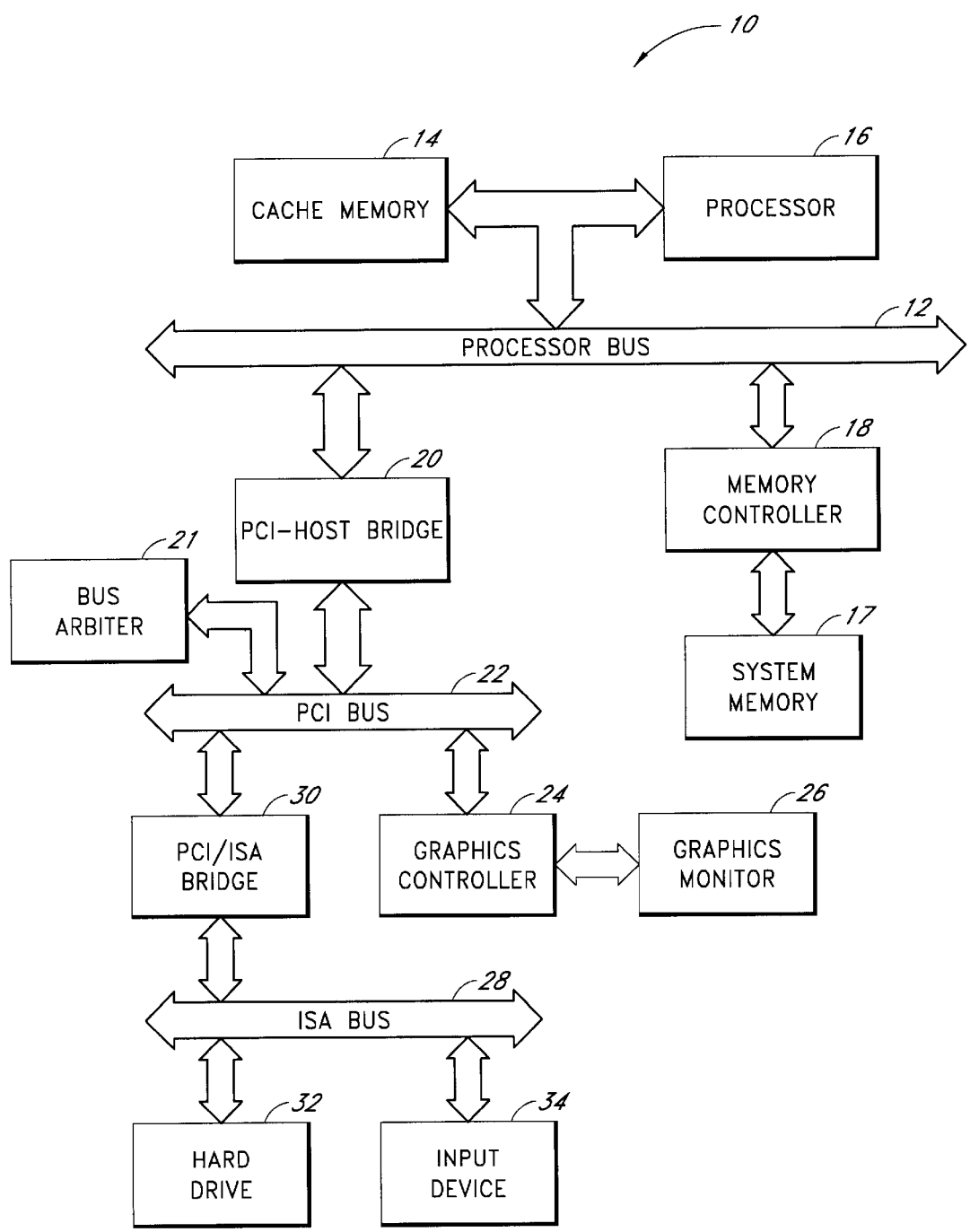
FIG. 1 is a block diagram showing a computer system.
Figure 2:
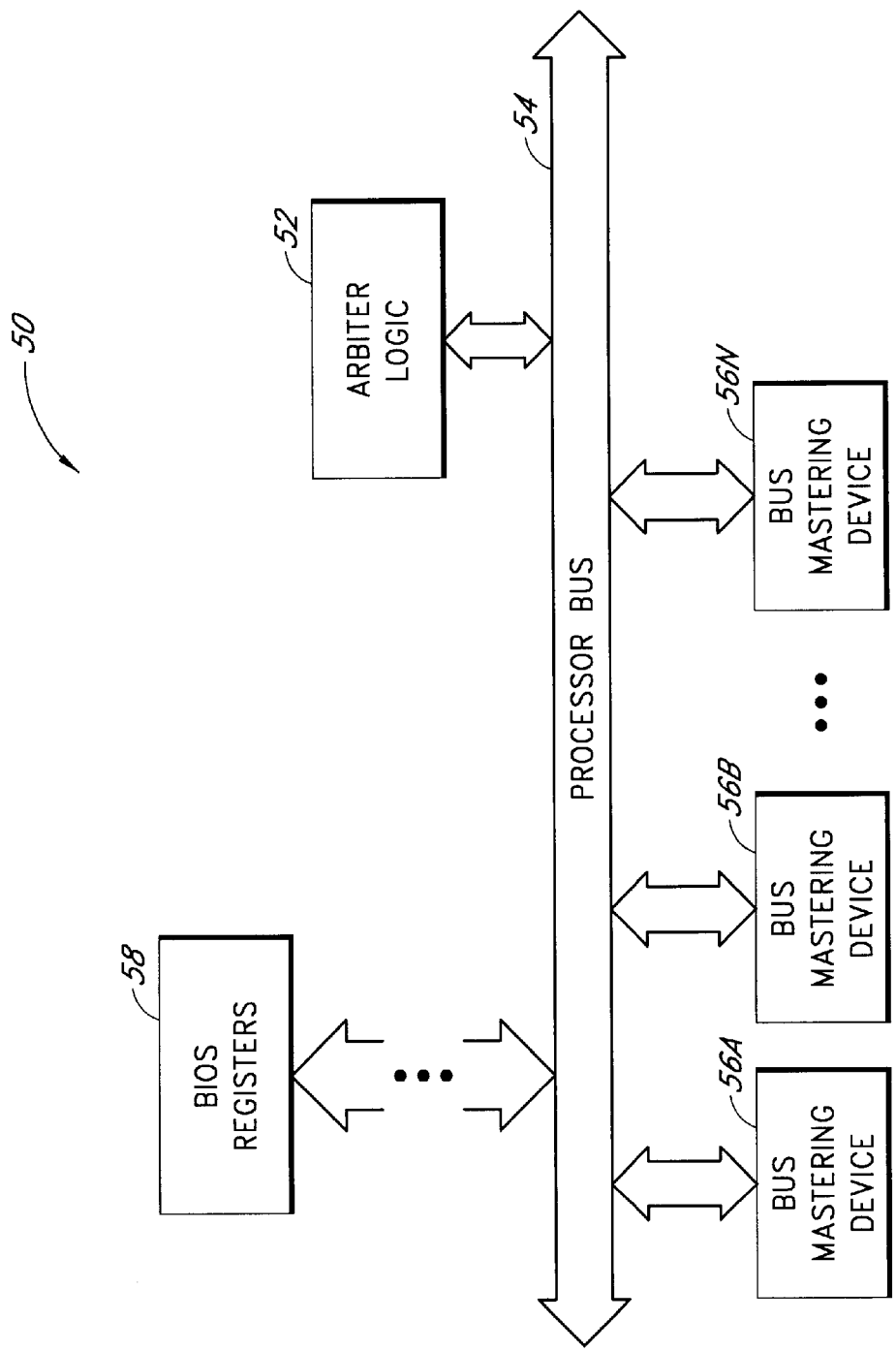
FIG. 2 is a block diagram showing a bus system in which the invention may be implemented.

The bus arbitration system and method of the invention arbitrates bus access based upon the performance characteristics of the devices. FIG. 2 is a block diagram showing a bus system 50 in which the invention may be implemented. In FIG. 2, an arbiter logic 52 controls access to a bus 54. A series of bus mastering devices 56A–56N contend for usage of the bus 54 by sending requests to the arbiter logic 52. The signaling scheme by which the bus mastering devices 56A–56N request control of the bus 50 and by which the arbiter logic 52 assigns control of the bus 50 is not critical and may occur in any one of a plurality of currently known and later developed signaling techniques. For example, the signaling may operate in accordance with PCI bus specification, revision 2.1.

At the time the system in which the bus system 50 resides is booted, the desired weighted bandwidth requirement of each of the slots associated with the bus 54 is measured and stored in a basic input output system (BIOS) register 58. For example, in a system in which six bus mastering devices operate over a common bus, the desired weighted bandwidths stored may be 8,8,2,2,2,1 reflecting that two of the devices can operate about 4 times faster than three of the other devices and about 8 times faster than the one remaining device. In addition to data transfer speed, the desired weighted bandwidth may also reflect the data transfer size, number of requests or latency requirements associated with the device or a combination of these and other factors. For example, a device which cannot tolerate a large latency is promoted over those which are more tolerant of latency. In one embodiment, the slowest device on the bus is assigned a weighted bandwidth of 1. The performance of the other devices is measured with reference to the slowest device to generate the proportional weighted bandwidths. The arbiter logic 52 can access these values in the BIOS registers 58 for use in the access determination process. Access to the bus is also governed by reference to a priority ranking of the bus mastering devices 56A–56N so that the fastest devices do not completely monopolize the bus to the exclusion of the slower devices.

When multiple bus mastering devices 56A–56N request access to the bus at the same time, the arbiter logic 52 uses the priority rank of each device to determine which of the bus mastering devices shall access the bus 54. Once access to the bus 54 is granted to the requesting device with the highest priority rank, the selected device executes one bus transfer and then relinquishes control of the bus 54. When control is relinquished by the first device, subsequent control of the bus 54 may be passed to another one of the bus mastering devices 56A–56N or to the same device again.

In one embodiment, the bus arbiter 52 grants access to the bus 54 to the requesting bus mastering devices 56A–56N with the highest priority regardless of the current or desired value of the corresponding weighted bandwidth. Unlike the prior art, the priority of the bus mastering devices 56A–56N is not changed each time that access is granted to the bus 54. Instead, each time that a device is granted access to the bus 54, the value of its current weighted bandwidth is decremented. When the value of the current weighted bandwidth is equal to a minimum value, the priority rank of the device is set to the minimum value and the priority rank of the devices which previously had a lower priority rank is incremented. The current weighted bandwidth of the device is reset to the desired value. In this way, the bus resources are allocated among the devices in a manner which allows the faster devices to have more frequent access to the bus, thus increasing the average amount of data transferred over the bus without allowing the faster devices to monopolize the bus to the exclusion of the slower devices.

As transactions over the bus are completed, the total number of bus access requests that have been served are tallied. In addition, the number of granted requests corresponding to each device is also tallied. After a significant number of transactions have been completed over the bus, the ratio of the number of granted requests for the device to the total number of granted requests is calculated for each device. If ratios are comparable to the desired weighted bandwidths, the system is balanced and no changes are made. If the ratios are not comparable to the desired weighted bandwidths, the weighted bandwidths of the devices may be adjusted to more closely match the actual performance of the system. For example, if the ratio for a particular device is significantly lower than the desired weighted bandwidth of the device in relation to the sum of the other weighted bandwidths, the desired weighted bandwidth of the device may be incremented so that additional resources are grated to the device during subsequent operation. A maximum weighted bandwidth for each device may be established to prevent domination by one device. In one embodiment, this may be implemented with a register which is incremented or decremented in order to accommodate additional bandwidth requirements. In alternative embodiments, the number of data transfers or some other measure of data transfer could be used in place of the number of requests or grants.

Figure 3:
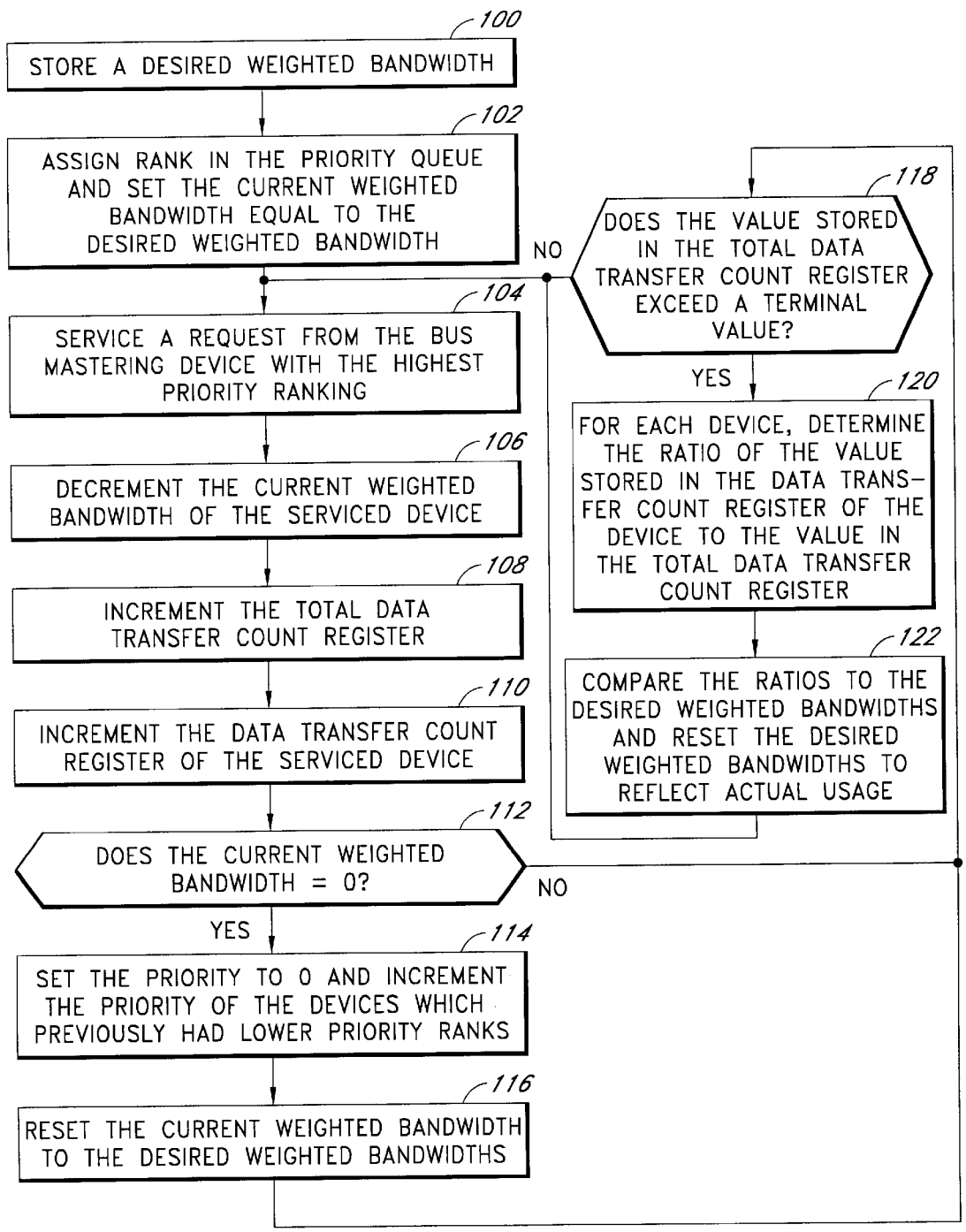
FIG. 3 is a flow chart showing exemplary operation of the arbiter logic according to the invention.

Through the adjustment of the desired weighted bandwidths, the loading on the bus is dynamically adjusted during operation. The adjustments could occur after a certain number of total transactions have been completed, after a certain amount of time, after a certain number of times that a current weighted bandwidth of a device has reached the minimum value, or a variety of other individual or combined criteria FIG. 3 is a flow chart showing exemplary operation of the arbiter logic according to the invention. In block 100, the desired weighted bandwidth for each bus mastering device is stored. In block 102, each bus mastering device is assigned a rank in the priority queue. In one embodiment, the assignment is arbitrary. In another embodiment, the assignment may be based upon the desired weighted bandwidth of the devices. In yet another embodiment, the assignment may be based upon the location of the corresponding device within the computer. Also in block 102, the current weighted bandwidth of each device is set equal to the desired weighted bandwidth. In block 104, a bus access request is serviced for the device which request bus resources with the highest priority rank. In block 106, the current weighted bandwidth of the serviced device is decremented. In an alternative embodiment, the number of data transfers or some other measure of data transfer could be used in place of the number of requests or grants. In block 108, the value in the total data transfer count register is incremented. In block 110, the data transfer count register corresponding to the serviced device is incremented.

In block 112 the bus arbiter determines whether the current weighted bandwidth of the serviced device is equal to zero. If so, in block 114, the priority rank of the serviced device is set to the lowest value and the priority rank of those devices which previously had a lower priority rank than the serviced device is incremented. In block 116, the current weighted bandwidth of the serviced device is set to the desired weighted bandwidth.

Flow from block 116 continues to block 118. Flow from block 112 also continues to block 118 if the current weighted bandwidth of the serviced device is not equal to zero. In block 118 the bus arbiter determines whether the value stored in the total data transfer count register exceeds a predetermined terminal value. If not, flow continues back to block 104 where another request for bus access is serviced.

If the value stored in the total data transfer count register exceeds the predetermined terminal value, flow continues to block 120. In block 120, for each device, the ratio of the value stored in the data transfer count register corresponding to the device to the value stored in the total data transfer count register is determined. In block 122, each ratio is compared to the ratio of the corresponding desired weighted bandwidth for the device divided by the sum of all of the desired weighted bandwidths. If the values differ greatly, the desired weighted bandwidth may be either increased or decreased to more closely match the data transfer ratio.

In this way, the bandwidth of the bus dynamically adjusts to favor the high throughput devices and keep the system balanced even though the overall throughput of the system cannot meet the needs of all the requesters. For example, if high speed RAID controllers or fiber network connections share a bus with low speed bus mastering devices such as low speed network connections or printer controllers, the high speed devices are allocated a larger portion of the available bus resources. Compared to the prior art, the total amount of data transferred over the bus is increased.

Operation of the arbitration system is best illustrated by way of example. The example below is described with reference to Table I. In Table I, it is assumed that six bus mastering devices compete for the resources of a common bus. The devices are labeled 1–6. Initially the devices 1–6 have a desired weighted bandwidth of 8,8,2,2,2,1, respectively. Initially, the devices are assigned a priority of 5,4,3, 2,1,0 respectfully. This initial state is shown in the first column of Table I labeled State 1.

TABLE I

|  | State 1 | State 2 | State 3 | State 4 | State 5 | State 6 |
| --- | --- | --- | --- | --- | --- | --- |
| device serviced |  | 1 | 3 | 3 |  | 5 |
| #1 priority | 5 | 5 | 5 | 5 | 5 | 5 |
| #1 weight | 8 | 7 | 7 | 7 | 7 | 7 |
| #2 priority | 4 | 4 | 4 | 4 | 4 | 4 |
| #2 weight | 8 | 8 | 8 | 8 | 8 | 8 |
| #3 priority | 3 | 3 | 3 | 3 | 0 | 0 |
| #3 weight | 2 | 2 | 1 | 0 | 2 | 2 |
| #4 priority | 2 | 2 | 2 | 2 | 3 | 3 |
| #4 weight | 2 | 2 | 2 | 2 | 2 | 2 |
| #5 priority | 1 | 1 | 1 | 1 | 2 | 2 |
| #5 weight | 2 | 2 | 2 | 2 | 2 | 1 |
| #6 priority | 0 | 0 | 0 | 0 | 1 | 1 |
| #6 weight | 1 | 1 | 1 | 1 | 1 | 1 |

The first time that the bus arbiter polls for requests for bus resource, devices 1, 3 and 5 each request service. Because device 1 has the highest priority, it is serviced first. State 2 illustrates the state of the system after the device 1 has been serviced. The weighted bandwidth of the device 1 has been decremented from 8 to 7. The priority of all devices remains unchanged.

The second time that the bus arbiter polls for requests for bus resources, the devices 3 and 5 are each requesting service. Because device 3 has the highest priority of the two, it is serviced next. State 3 illustrates the state of the system after the device 3 has been serviced. The weighted bandwidth of the device 3 has been decremented from 2 to 1. The priority of all devices remains unchanged.

The third time that the bus arbiter polls for requests for bus resources, again the devices 3 and 5 are each requesting service. Because device 3 has the highest priority of the two, it is serviced. State 4 illustrates the state of the system after the device 3 has been serviced. The weighted bandwidth of the device 3 has been decremented from 1 to 0.

In State 4, the weighted bandwidth of the device 3 has reached the minimum value of 0. Therefore, the priority of the device 3, 4, 5 and 6 change. State S illustrates the state of the system after these priorities have been changed. The priority of device 3 is set to 0 and the priority of device 4 has been increased from 2 to 3. The priority of device 5 has been increased from 1 to 2 and the priority of device 6 has been increased from 0 to 1. The current weighted bandwidth of the device 3 has been reset to the desired weighted bandwidth value of 2.

The fourth time that the bus arbiter polls for requests for bus resources, the devices 3 and 5 are each requesting service. Because device 5 now has a higher priority than device 3, it is serviced next. State 6 illustrates the state of the system after the device 5 has been serviced. The weighted bandwidth of the device 5 has been decremented from 2 to 1. The priority of all devices remains unchanged.

A myriad of alternative embodiments will be readily apparent to one skilled in the art based upon the disclosure herein. The invention may be applied to a Peripheral Components Interconnect (PCI) bus, other well known buses or later developed bus protocols. The bus may be located within a personal computer, a network computer or any other manner of electronic equipment where multiple units compete for limited communication resources.

The invention may be embodied in other specific forms without departing from its spirit or essential characteristics. The described embodiment is to be considered in all respects only as illustrative and not restrictive and the scope of the invention is, therefore, indicated by the appended claims rather Man by the foregoing description. All changes which come within the meaning and range of equivalency of the claims are to be embraced within their scope.

What is claimed is:

1. A method of arbitrating access to a common bus by a plurality of devices comprising:

assigning each of said plurality of devices a priority rank;

setting a current weighted bandwidth of each of said plurality of devices equal to a desired weighted bandwidth;

servicing a request to access said common bus from a first device of said plurality of devices, said first device having the highest priority rank among a set of requesting devices;

decrementing said current weighted bandwidth of said first device;

setting said priority rank of said first device equal to a lowest priority if said decremented current weighted bandwidth of said first device is equal to a minimum value and increasing said priority rank of a set of devices which previously had a lower priority rank than said first device;

setting said current weighted bandwidth of said first device equal to said desired weighted bandwidth; and dynamically adjusting said desired weighted bandwidth of said first device during operation based upon a history of actual usage of said common bus by said first device, wherein said history comprises a record of bus accessed granted to said first device, and a record of bus accesses granted to others of said plurality of devices, occurring within a defined period.

2. The method of claim 1 wherein said desired weighted bandwidth is different for different devices of said plurality of devices.

3. The method of claim 1 wherein said desired weighted bandwidth of said first device is representative of a rate at which said first device transfers data over said common bus.

4. The method of claim 1 wherein said desired weighted bandwidth of each of said plurality of devices is updated based upon actual usage of said common bus.

5. The method of claim 1 wherein the act of dynamically adjusting said desired weighted bandwidth comprises:

determining a total number of serviced requests corresponding to all of said plurality of devices;

determining a total number of serviced requests corresponding to said first device; and determining a new desired weighted bandwidth for said first device based upon a ratio of said total number of serviced requests corresponding to said first device with respect to said total number of serviced requests corresponding to all of said plurality of devices.

6. The method of claim 1 wherein said desired weighted bandwidth of each device is initially determined during a basic input output system test routine executed during initial system boot.

7. The method of claim 1 wherein decrementing said current weighted bandwidth is based upon a measure of data transfer corresponding to said first device.

8. A method of arbitrating access to a common bus comprising:

determining a rate at which a first device is capable of transferring data over said common bus;

determining a rate at which a second device is capable of transferring data over said common bus;

assigning a desired weighted bandwidth to said first device and a desired weighted bandwidth to said second device based upon said rate of said first and second devices;

arbitrating access to said common bus based upon said desired weighted bandwidth of said first and second devices; and dynamically adjusting said desired weighted bandwidth of said first and second devices during operation based upon a history of actual usage of said common bus by said first and second devices, wherein said history comprises multiple bus accesses granted to at least one of said first and second devices.

9. The method of claim 8 wherein dynamically adjusting said desired weighted bandwidth comprises:

determining a total number of bus accesses granted;

determining a number of bus accesses granted to said first device;

determining a number of bus accesses granted to said second device;

comparing the ratio of said number of bus accesses granted to said first device with respect to said total number of bus accesses granted to said desired weighted bandwidth of said first device and said desired weighted bandwidth of said second device; and adjusting said desired weighted bandwidth of said first device based upon said comparison.

* * * * *